United States Patent [19]

Suda et al.

[11] 3,862,870

[45] Jan. 28, 1975

[54] METHOD FOR THE PREPARATION OF INCOMBUSTIBLE COMPOSITE MATERIALS

[75] Inventors: Hiroshi Suda; Hideo Matui, both of Iwaki, Japan

[73] Assignee: Kureha Kagaku Kogyo Kabushiki Kaisha, Tokyo, Japan

[22] Filed: Dec. 6, 1973

[21] Appl. No.: 422,429

[30] Foreign Application Priority Data
Dec. 12, 1972  Japan.............................. 47-123999

[52] U.S. Cl.................. 156/273, 156/333, 161/161, 161/254
[51] Int. Cl. ....................... B29c 19/02, B32b 3/26
[58] Field of Search ............ 156/273, 333; 161/161, 161/160, 254, 256; 264/45

[56] References Cited
UNITED STATES PATENTS

| | | | |
|---|---|---|---|
| 2,772,194 | 11/1956 | Fisher et al. ........................ | 161/161 |
| 3,052,587 | 9/1962 | Spieles .............................. | 156/273 |
| 3,501,370 | 3/1970 | Juredine ........................... | 161/161 |

Primary Examiner—Douglas J. Drummond
Attorney, Agent, or Firm—Lane, Aitken, Dunner & Ziems; George A. Loud

[57] ABSTRACT

A method for the preparation of incombustible composite materials having high inter-layer adhesive strength and small permanent compression distortion, the method comprising interposing between a layer of a polyvinyl chloride sheet and a layer of hardboard sheet an intermediate layer of a soft foam. The intermediate layer is prepared by covering a soft foam sheet with a latex of vinylidene chloride-based copolymer. The vinylidene chloride-based copolymer is obtained by copolymerization of 65 – 95 parts by weight of vinylidene chloride monomer, 5 – 35 parts by weight of a vinyl monomer not containing any unsubstituted corboxyl group and 1 – 10 parts by weight of a vinyl monomer containing at least one unsubstituted carboxyl group. The respective layers are bonded together by high frequency welding.

9 Claims, No Drawings

METHOD FOR THE PREPARATION OF INCOMBUSTIBLE COMPOSITE MATERIALS

FIELD OF THE INVENTION

This invention relates to a method for the production of incombustible composite materials or laminated boards which are composed of three layers and have high inter-layer adhesive strength and low permanent compression distortion.

BACKGROUND OF THE INVENTION

Composite materials are widely used as construction material and as material for furnishing interiors of, for example, motor vehicles. Such composite materials generally consist of three superposed and securely adhered layers, i.e., a first or surface layer of polyvinyl chloride, a second or intermediate layer of a soft foam, and a third or base layer of a hardboard. In order to ensure high versatility, the composite materials are required to be incombustible and to have a high inter-layer adhesive strength and low permanent compression distortion.

In the production of composite materials, it is the usual practice to use an adhesive for bonding together the individual layers, e.g., the layer of a polyvinyl chloride sheet, the intermediate layer of a soft polyurethane foam and a layer of a hardboard. However, existing composite materials of this nature have deficiencies such as low inter-layer strength and high permanent compression distortion and are undesirably combustible.

In one method, directed toward improving the inter-layer adhesive strength and reducing the permanent compression distortion in the production of composite materials, a soft polyvinyl chloride foam which is capable of thermally adhering to both a polyvinyl chloride sheet and a hardboard is sandwitched between a layer of a polyvinyl chloride sheet and a layer of a hardboard and the three layers are bonded to each other by subjecting same to a high frequency. However, this method is unsatisfactory in that the resultant composite material is combustible due to the presence of a larger amount of combustible plasticizer in the soft polyvinyl chloride foam.

Another prior art method for the fabrication of composite materials comprises immersing a soft foam such as a soft polyurethane foam, a soft rubber foam or the like, which is not capable of being thermally welded to either a polyvinyl chloride sheet or hardboard, in a latex of a polyvinyl chloride resin which has affinity for both the polyvinyl chloride sheet and hardboard, drying the adhering latex to cover the entire soft foam with a polyvinyl chloride film, sandwiching the film-covered soft foam between a polyvinyl chloride sheet and a hardboard sheet, and bonding or welding the assembly by application of a high frequency to the polyvinyl chloride films which serve as bonding mediums. However, this method suffers from a disadvantage in that when the latex, which is impregnated in the soft foam, is dried or welded with high frequency a large amount of a combustible plasticizer contained in the latex is evaporated to the detriment of the working environment. Also, where the polyvinyl chloride resin latex contains a large amount of a combustible plasticizer the result is invariably a highly combustible composite material.

If the polyvinyl chloride used in the above method is replaced by a latex of a vinylidene chloride copolymer such as a vinylidene chloride-vinyl chloride copolymer, vinylidene chloride-acrylonitrile copolymer, or the like, the result is poor thermal adhesion to the polyvinyl chloride sheet and hardboard, and it becomes necessary to apply an adhesive between the respective layers prior to high frequency welding. Furthermore, the resultant composite material does not possess the desired degree of incombustibility due to the presence of the adhesive.

Alternatively, if the latex of polyvinyl chloride resin is replaced by a latex of another film-forming synthetic resin such as a butadiene-styrene copolymer, most of the synthetic resins the result is usually a poor bond with the polyvinyl chloride sheet and hardboard. As in the above case, the use of an adhesive between the respective layers is required which results in a composite material which is unacceptably combustible.

Accordingly, there has been a strong demand for a method which is capable of bonding, by simple heat adhesion, a first layer of a polyvinyl chloride sheet, a second layer of a soft foam, and a third layer of a hardboard, to produce an incombustible material with a high inter-layer adhesive strength and small permanent compression distortion.

SUMMARY OF THE INVENTION

It is therefore an object of the present invention to provide a method for the production of an incombustible composite material which has a high degree of inter-layer adhesion and small permanent compression distortion. Another object is to provide a means for bonding a layer of a polyvinyl chloride sheet, a second layer of a soft foam which does not thermally adhere to polyvinyl chloride sheet or hardboard, and a third layer of a hardboard sheet.

Other objects and advantages, and features of the present invention will become apparent from the following description.

It has now been found that the foregoing objects can be attained with a latex of a vinylidene chloride-based copolymer of 65–95 parts by weight of vinylidene chloride monomer, 5–35 parts by weight of a vinyl monomer having no unsubstituted carboxyl group, and 1–10 parts by weight of a vinyl monomer having at least one unsubstituted carboxyl group. The vinylidene chloride-based copolymer exhibits excellent affinity for the polyvinyl chloride sheet and the hardboard.

In accordance with the present invention, there is provided a method for the preparation of an incombustible composite material which has high inter-layer adhesive strength and small permanent compression distortion. The method involves forming a sandwich having as outer layers a sheet of hardboard and a sheet of polyvinyl chloride and, as a central core, a layer of a soft foam which has been coated on both sides with a film of vinylidene chloride-based copolymer which is obtained by the copolymerization of 65–95 parts by weight of vinylidene chloride monomer, 5–35 parts by weight of vinyl monomer containing no unsubstituted carboxyl group, and 1–10 parts by weight of vinyl monomer having at least one unsubstituted carboxyl group. The sandwich assembly is subjected to high frequency welding to bond the respective layers securely to each other.

DETAILED DESCRIPTION OF THE INVENTION

The vinylidene chloride-based copolymer latex used in the present invention can be prepared by copolymerizing 65-95 parts by weight of vinylidene chloride monomer, 5-35 parts by weight of a vinyl monomer which contains no unsubstituted carboxyl group, and 1-10 parts by weight of vinyl monomer which contains at least one unsubstituted carboxyl group, in water in the presence of a conventional emulsifier, a catalyst and a stabilizer. If the ratios are not within the above-defined ranges, it is difficult to attain the objects of the present invention.

The vinyl monomers which do not contain an unsubstituted carboxyl-group and which are suitable for the purpose of the present invention include, for example, vinyl chloride, acrylonitrile, methacrylonitrile, acrylic amide, methacrylic amide, vinyl acetate, vinyl propionate, acrylic esters methacrylic esters and the like. Vinyl monomers which contain at least one unsubstituted carboxyl and which are suitable for use in the present invention include, for example, dibasic unsaturated organic acids (which may be in the form of an anhydride) such as maleic acid, fumaric acid, itaconic acid or the like, and half esters thereof, and monobasic unsaturated organic acids such as acrylic acid, methacryl acid and the like.

The soft foam care may be a soft polyurethane foam, soft rubber foam, or like foam which does not normally afford thermal adhesion to the polyvinyl chloride sheet or the hardboard sheet. The foam is coated with the latex of vinylidene chloride-based copolymer, and dried to give a vinylidene chloride-base copolymer film-covered soft foam.

The soft foam may be coated with the latex on both surfaces or may be immersed in the latex. The foam is then allowed to stand at room temperature or in hot air to evaporate water in the latex for drying.

The foam covered with a film of the vinylidene chloride-based copolymer is sandwiched between a polyvinyl chloride sheet and a hardboard sheet, and the assembly is then subjected to high frequency welding to form a composite material. The vinylidene chloride-based copolymer resin has high affinity for both the polyvinyl chloride sheet and the hardboard sheet, so that the layers are thermally bonded or welded with each other by means of the vinylidene chloride-based copolymer. In this connection, it should be noted that the vinylidene chloride-based copolymer is incombustible and accordingly, the vinylidene chloride-based copolymer film-covered soft foam is also rendered incombustible, with the result that the resultant composite material is incombustible. The surface layer may be a polyvinyl chloride sheet of any desired type, including so-called polyvinyl chloride leather. A hardboard particularly useful in the present invention can be obtained by impregnating a sheet of vegetable fibre with a liquid synthetic resin and press-molding the impregnated sheet, and may be any of those which are generally referred to as particle board or hardboard.

Thus, the use of the vinylidene chloride-based copolymer film-covered foam facilitates the high frequency welding of the three layers. The resultant composite material is incombustible and shows a high interlayer adhesive strength even at 80°C as well as at room temperature and small permanent compression distortion (as determined in accordance with the testing method of Japanese Industrial Standard K-6382).

The present invention will be further illustrated in the following Examples which, however, should not be construed as limiting the present invention which is defined by the appended claims.

EXAMPLE 1

Soft polyurethane foam sheets having a thickness of 2 mm were respectively immersed in copolymer latices having the following formulations to obtain sheets which were impregnated with the respective latices in an amount of 56 g/m², and then dried at room temperature and then at 50°C for 30 min.

| Formulation (1); | Vinylidene chloride: | Methylacrylate: | Acrylic acid |
|---|---|---|---|
| Ratio by weight | 92 | 8 | 2.5 |
| Resin Concentration: | 50 % | | |
| Formulation (2); | Vinylidene chloride: | Vinyl chloride: | Monomethyl-maleate |
| Ratio by Weight | 75 | 25 | 8 |
| Resin Concentration: | 50 % | | |
| Formulation (3); | Vinylidene chloride: | Methylacrylate | |
| Ratio by Weight | 91.5 | 8.5 | |
| Resin Concentration: | 50 % | | |
| Formulation (4); | Vinylidene chloride: | Vinyl chloride | |
| Ratio by Weight | 65 | 35 | |
| Resin Concentration: | 50 % | | |

Then, the film-covered soft polyurethane foam sheets were each sandwiched between a polyvinyl chloride sheet serving as a first layer and a hardboard sheet serving as a third layer, and then subjected to high frequency welding to form the respective composites. Thereafter, the composite sheets were respectively cut into test pieces each having a width of 25 mm. The test pieces were each subjected to an adhesion test. The test results are shown below.

| | Adhesion Strength at Room Temperature | Adhesion Strength after Heating (80°C 24 hrs) |
|---|---|---|
| (1) | 1350 g | 1200 g |
| (2) | 1200 | 1000 |
| (3) | 800 | 400 |
| (4) | 750 | 350 |

It will be apparent from the Table that the composite sheets which had second layers treated with the latices (1) and or (2) respectively, containing an unsaturated organic acid monomer (i.e., vinyl monomer containing at least one unsubstituted carboxyl group) had high adhesive strength. On the other hand, the composite materials using latices (3) and (4), respectively, which did not contain such a monomer exhibited low adhesive strength.

EXAMPLE 2

Soft polyurethane foam sheets having a thickness of 2 mm were respectively immersed in copolymer latices having the following formulations to obtain the sheets impregnated with the respective latices in an amount of 56 g/m$^2$, and then dried at room temperature and then at 50°C for 30 min.

Formulation (5);

|  | Vinylidene cloride: | Methylacrylate: | Acrylic acid |
|---|---|---|---|
| Ratio by Weight | 92 | 8 | 3 |
| Resin Concentration: | 50 % | | |

Formulation (6);

|  | Vinylidene chloride: | Vinyl chloride: | Monomethyl-maleate |
|---|---|---|---|
| Ratio by Weight | 75 | 25 | 8 |
| Resin Concentration: | 50 % | | |

Formulation (7);

|  | Vinylidene cloride: | Vinyl chloride: | Monomethyl-maleate |
|---|---|---|---|
| Ratio by Weight | 25 | 75 | 8 |
| Resin Concentration: | 50 % | | |

The thus treated soft polyurethane foam sheets were respectively formed into composite sheets by high frequency welding in the same manner as in Example 1. The composite sheets were subjected to a heat-resistant test thermostatically controlled at 80°C for 24 hours to test the state of adhesion between the polyurethane foam sheet and hardboard. As a result, the composite sheets formed using latices (5) and (6) did not separate, but the composite formed using the latex (7) partially separated to a degree unsuitable for practical purposes.

EXAMPLE 3

Soft polyurethane foam sheets each having a thickness of 2 mm were respectively immersed in copolymer latices having the following formulations for impregnation of the sheets with the respective latices in an amount of 56 g/m$^2$, and then dried in a dryer of 105°C for 3 min.

prescribed in Japanese Industrial Standards K-6382, and were heated at 70° ± 2°C for 22 hours. Thereafter, the compressing load was removed from the sheets, which were further maintained at 70° ± 2°C for 2 hours and then allowed to stand at room temperature for 1 hour to determine permanent compression distortion. The test results are as follows:

|  | Permanent Compression Distortion (%) |
|---|---|
| Foam Sheet Treated With Latex (8) | 18 |
| Foam Sheet Treated With Latex (9) | 42 |
| Foam Sheet Treated With Latex (10) | 20 |

The permanent compression distortion of a non-treated polyurethane foam sheet was 10%. The foam sheet treated with the latex (9) appeared to be unsuitable for practical use.

That which is claimed is:

1. A method for the preparation of an incombustible composite material, comprising:
   covering a soft foam base material with a vinylidene chloride-base copolymer, which is a copolymerization product of 65–95 parts by weight of vinylidene chloride monomer, 5–35 parts by weight of a first vinyl monomer not having any unsubstituted carboxyl group and 1–10 parts by weight of a second vinyl monomer containing at least one unsubstituted carboxyl group;
   drying said coating on said foam base;
   interposing said coated foam between a polyvinyl chloride sheet and a hardboard sheet; and
   bonding the respective layers together by high frequency welding.

2. A method according to claim 1, wherein said first vinyl monomer is selected from vinyl chloride, acrylo- Formulation (8);

|  | Vinylidene chloride: | Methylacrylate: | Acrylic acid |
|---|---|---|---|
| Ratio by Weight | 93.3 | 6.7 | 2.8 |
| Resin Concentration: | 50 % | | |

Formulation (9);

|  | Vinylidene chloride: | Vinyl chloride: | Monomethyl-maleate |
|---|---|---|---|
| Ratio by Weight | 60 | 40 | 5.0 |
| Resin Concentration: | 50 % | | |

Formulation (10);

|  | Vinylidene chloride: | Vinyl chloride: | Monomethyl-maleate |
|---|---|---|---|
| Ratio by Weight | 75 | 25 | 5.0 |
| Resin Concentrration: | 50 % | | |

The thus dried soft polyurethane foam sheets were respectively compressed to 50% of the orginal thickness and fixed in accordance with a testing method as nitrile, methacrylonitrile, acrylic esters and methacrylic esters.

3. A method according to claim 1 wherein said second vinyl monomer is a dibasic unsaturated organic acid.

4. A method according to claim 3 wherein said dibasic unsaturated organic acid is selected from maleic acid, fumaric acid and itaconic acid.

5. A method according to claim 1 wherein said second vinyl monomer is a half-ester of a dibasic unsaturated organic acid.

6. A method according to claim 5 wherein said dibasic unsaturated organic acid is selected from maleic acid, furmaric acid and itaconic acid.

7. A method according to claim 1 wherein said second vinyl monomer is a monobasic unsaturated organic acid.

8. A method according to claim 7 wherein said monobasic unsaturated organic acid is acrylic acid or methacrylic acid.

9. A composite material obtained by the method of claim 1.

* * * * *